United States Patent
Pesta et al.

[11] Patent Number: 6,131,993
[45] Date of Patent: Oct. 17, 2000

[54] SEAT BACK PANEL

[75] Inventors: Christopher J. Pesta, Sterling Heights; Matthew E. Dukatz; Harlan E. Kifer, both of Bloomfield Hills, all of Mich.

[73] Assignee: DaimlerChrysler Corporation, Auburn Hills, Mich.

[21] Appl. No.: 09/294,651

[22] Filed: Apr. 19, 1999

[51] Int. Cl.[7] .................................................. A47C 7/62
[52] U.S. Cl. ........................ 297/188.04; 297/183.7; 297/452.38
[58] Field of Search .......................... 297/183.1, 183.6, 297/183.7, 188.04, 452.18, 452.38

[56] References Cited

U.S. PATENT DOCUMENTS

| | | | |
|---|---|---|---|
| 1,904,510 | 4/1933 | Mott . | |
| 3,019,050 | 1/1962 | Spielman | 297/188.04 X |
| 3,333,890 | 8/1967 | Whitman | 297/188.04 |
| 4,564,240 | 1/1986 | Thieme | 297/452.14 |
| 4,795,067 | 1/1989 | Hamilton | 224/42.42 |
| 5,004,295 | 4/1991 | Inoue | 297/191 |
| 5,415,457 | 5/1995 | Kifer | 297/188.04 |
| 5,492,257 | 2/1996 | Demick | 297/188.04 X |
| 5,709,328 | 1/1998 | Ackeret | 224/282 |
| 5,713,627 | 2/1998 | De Filippo | 297/188.04 |
| 5,769,294 | 6/1998 | Heinz et al. | 224/567 |
| 5,788,324 | 8/1998 | Shea et al. | 297/188.04 X |
| 5,863,092 | 1/1999 | Kifer | 297/188.04 |

*Primary Examiner*—Peter R. Brown
*Attorney, Agent, or Firm*—Lawrence J. Shurupoff

[57] ABSTRACT

A vehicle seat with a rear facing seat back panel includes a perimeter wall having an upper wall portion interconnected with a lower wall portion by first and second opposed side wall portions. A central panel portion with lateral edge portions recessed from the perimeter wall and connected to the first and second side portions is also provided. An upper edge portion of the central panel portion is spaced apart from the upper wall portion defining an aperture such that the upper wall portion of the perimeter wall forms an integral hand grip. Additionally hooks for holding grocery bags are also provided and a membrane can be added to form a map pocket and umbrella pocket.

22 Claims, 3 Drawing Sheets

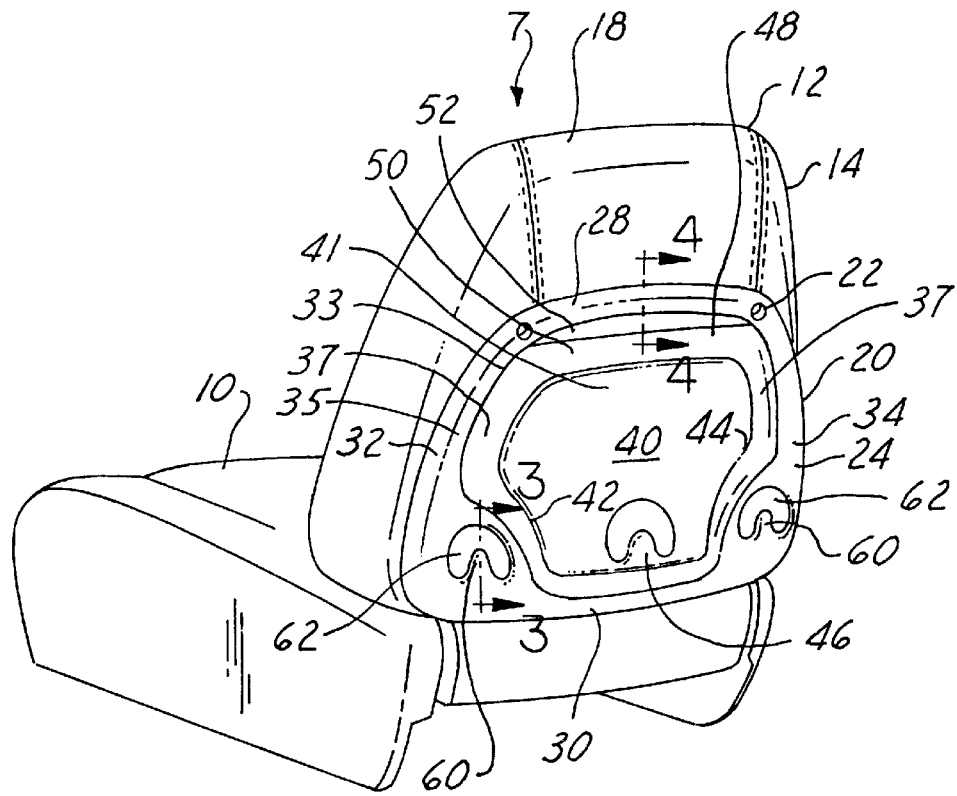
FIG. 1
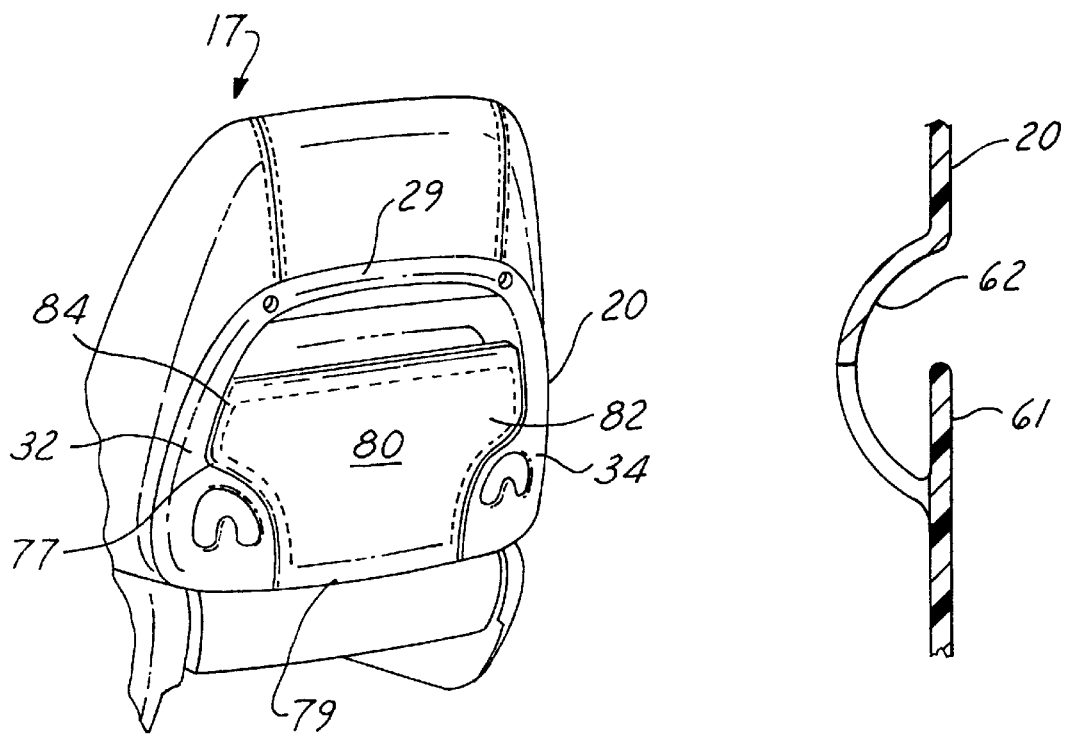
FIG. 2
FIG. 3

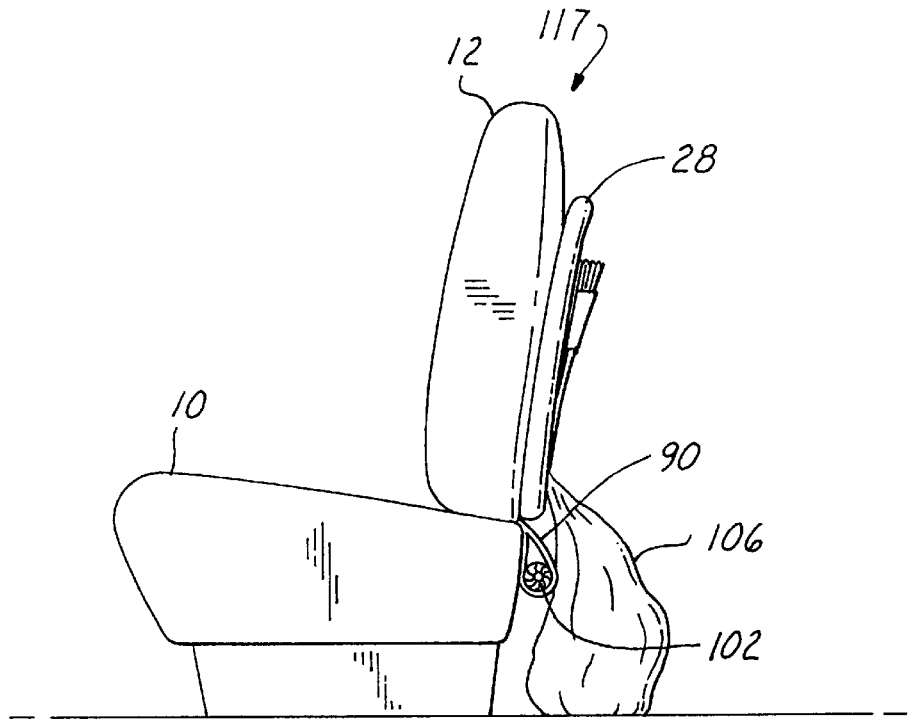
FIG. 7
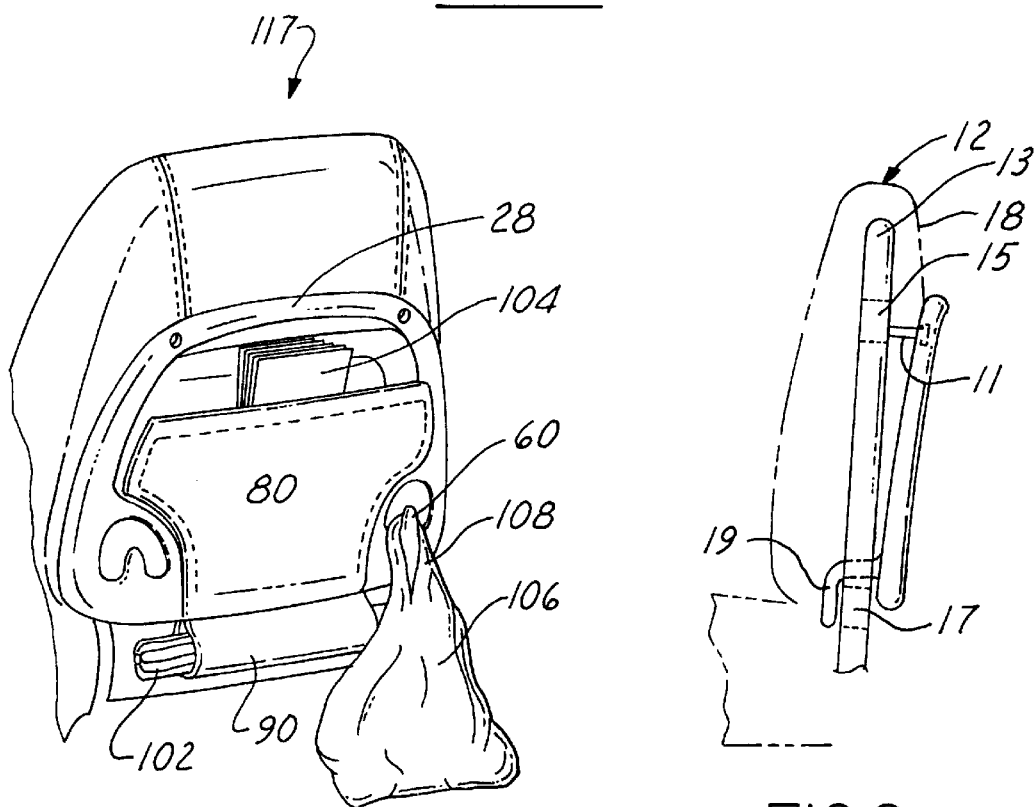
FIG. 8
FIG. 9

6,131,993

SEAT BACK PANEL

FIELD OF THE INVENTION

The present invention relates to automotive vehicle seating. More particularly the present invention relates to seat back panels for automotive seating.

DESCRIPTION OF PRIOR DEVELOPMENTS

To increase energy efficiency, many automotive manufacturers have sought to reduce the aerodynamic drag experienced by vehicles. One method of reducing aerodynamic drag is to lower the roof of the vehicle. Lowering the roof of the vehicle can sometimes make the entering and exiting of the rear seat more difficult. Another trend in the automotive industry that is particularly consumer driven is the popularity of sport utility and minivan vehicles. However, most sport utility and minivan vehicles have a floor that is higher than a typical car floor. Entering or exiting a sport utility vehicle or a minivan can be more difficult for a rear seat passenger due to the height of the vehicle floor. It would be very desirable to add a hand grip which a vehicle seat occupant could utilize in entering and exiting vehicle rear compartments.

SUMMARY OF THE INVENTION

The present invention has been developed to meet the above noted needs. In a preferred embodiment, the present invention brings forth the freedom of providing a vehicle seat with an integral hand grip assist on a rear surface of a seat back. The integrated hand assist is provided by a seat back panel having a perimeter wall with an upper wall portion, lower wall portion and first and second side wall portions interconnecting the upper and lower wall portions. A central panel portion is provided. The central panel portion has lateral edges which are connected with the first and second side wall portions of the perimeter wall. The central panel portion lateral edges are recessed from the perimeter wall first and second side wall portions. The central panel portion has an upper edge portion spaced apart from the upper wall portion of the perimeter wall thereby defining an aperture therebetween such that the perimeter wall upper wall portion forms a hand grip. In still another preferred embodiment of the present invention, the seat back panel in addition provides grocery bag hooks to organize and retain grocery bags. In still another embodiment of the present invention, the seat back panel also provides a map pocket and an umbrella pocket.

It is an object of the present invention to provide an integral hand grip to the rear surface of a vehicle back seat. It is another object of the present invention to provide a back seat panel with an integral hand grip with grocery bag hooks and other storage pockets.

The above-noted objectives and other advantages of the present invention will become more apparent to those skilled in the art as the invention is further explained in the accompanying drawings and detailed description.

BRIEF DESCRIPTION OF THE DRAWINGS

FIG. 1 is a perspective view of a vehicle seat according to the present invention with a one piece plastic molded seat back panel with an integrated hand grip assist handle and grocery bag holders.

FIG. 2 is a perspective view similar to that of FIG. 1 of an alternate preferred embodiment of the present invention having a one piece plastic molded seat back with an integrated hand grip assist handle, grocery bag holder, and an additional map pocket provided by a connected fabric membrane.

FIG. 3 is an enlarged sectional view taken along line 3—3 of FIG. 1.

FIG. 7 is a side elevational view of the vehicle seat shown in FIG. 5 illustrating utilization of the map pocket, umbrella pocket, and grocery bag holder.

FIG. 8 is a rear perspective view of a vehicle seat as shown in FIG. 7.

FIG. 9 is a schematic view illustrating the connection of the back seat panel to a structural frame of the vehicle seat shown in FIG. 1.

DETAILED DESCRIPTION OF THE PREFERRED EMBODIMENT

Figure 4:
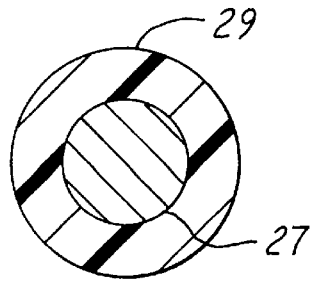
FIG. 4 is an enlarged sectional view taken along line 4—4 of FIG. 1.

Referring to FIGS. 1 and 9, an automotive vehicle seat 7 according to the present invention is provided. The seat 7 has a seat bun 10 to provide a seating surface for an automotive occupant. Pivotally or fixably connected to the seat bun 10 is a seat back 12. The seat back 12 is typically covered by a fabric, leather or plastic membrane cover 14. The seat back has a front surface to support the back region of a seat occupant and an oppose rear surface 18. The seat back 12 has a tubular frame arched structural member 13 which is generally shaped as an inverted U. The tubular frame 13 has a fixably connected upper cross member 15 and a fixably connected lower cross member 17.

The mid and lower sections of the seat back rear surface 18 are covered with a seat back panel 20 according to the present invention. As shown in FIG. 1, the seat back panel 20 is formed as a one piece member. Along its upper end the seat back panel 20 is attached by bolts 11 which have their heads fitted within bolt holes 22. The bolts which are inserted through the bolt holes 22, are threadably engaged with the upper cross member 15 of the vehicle seat back. A lower end of the seat back panel 20 is fitted to the seat back by a hook 19 which is fitted over the lower cross member 17. The seat back panel 20 is formed from a molded plastic such as polypropylene or other suitable alternatives. It is preferable that the plastic utilized have high impact resistance.

The seat back panel 20 has a perimeter wall 24. The perimeter wall 24 has an upper wall portion 28 and a lower wall portion 30. The perimeter wall upper wall portion 28 and lower wall portion 30 are interconnected via a first side wall portion 32 and a second side wall portion 34. The lower wall portion 30 and first and second side wall portions 32, 34 of the perimeter 24 are formed as a continuous ridge with a peak or edge 33. The ridge has an outboard side 35 and an inboard side 37. The ridge adds rigidity to the seat back panel 20.

Positioned between the first and second side wall portions 32 and 34 is a central panel portion 40. The central panel portion 40 has lateral side edge portions 42 and 44. Central panel portion lateral side edge portions 42 and 44 are recessed from the ridge peak 33 and blend into connection with the inboard side 37 of the outer wall perimeter ridge. Typically, the central panel portion 40 will have a central crown or hump 41 due to the transverse curvature of the seat back 12. The central panel portion 40 has a lower end 46 which is tapered or blended into connection with the perimeter lower wall portion 30. The central panel portion 40 has an upper rearwardly banked region 48 having an upper edge portion 50. The central panel portion upper edge portion 50 interfaces with and lies against the cover 14 of the seat back. The central panel upper edge portion 50 is separated apart from the upper wall portion 28 of the perimeter by an open space 52. The space 52 defines an aperture between the central panel upper edge 50 and the upper wall portion 28 such that the perimeter upper wall portion 28 provides an integrated hand assist handle grip 29 (FIG. 2).

The grip 29 is useful in aiding an occupant in a rear seat to enter or exit the vehicle. If desired, a decorative or cushioning cover (not shown) can be placed upon the grip 29. The grip 29 formed by the upper wall portion 28 of the perimeter is located above and rearwardly of the central panel portion top edge portion 50. The height of the grip 29 allows the grip 29 to be positioned so as not to intrude upon the leg room of a rear seat occupant. The hand grip 29 may optionally include a high strength material preform which is provided by a nylon insert 27 (FIG. 4) placed into the mold which is utilized in forming the back seat panel 20. The insert 27 will typically extend laterally beyond the bolt holes 22.

Referring additionally to FIG. 3, seat back panel 20 further includes a plurality of bag hangers or hooks 60. The hooks 60 are especially useful when transporting groceries which have been placed in a plastic grocery bag. Placing the handles of a plastic grocery bag on a hook 60 allows a grocery bag to be retained in position even when the articles in the grocery bag experience relative motion with respect to the vehicle due to acceleration/deceleration or turning of the vehicle. In the embodiment of FIG. 1 there are three grocery bag hooks 60. The hooks 60 are defined by a flush finger 61 surrounded by a crescent shaped aperture 62 formed by a depression. The depression of the aperture 62 provides more finger room when connecting a bag handle around the finger 61.

Referring to FIG. 2 a vehicle seat 17 provides an alternate preferred embodiment of the present invention. Items similar to the items for seat 7 are given like reference numerals. In FIG. 2 the seat back panel 20 additionally includes a map pocket 80. The map pocket 80 is provided by a cloth fabric or plastic membrane 82 which spans across the first and second side wall members 32 and 34. The map pocket membrane lateral side edges 77 and bottom 79 can be connected to the back seat panel 20 by sewing, gluing, heat staking or other appropriate methods. The opening of the map pocket 80 is defined by the space between the membrane 80 and the central panel portion 40. If the seat back 12 is thick enough, the crown 41 of the back seat panel can be flattened, eliminated or even depressed to increase the storage space in the map pocket 80. Optionally, the upper lateral edge portion 84 of the membrane side edges may not be attached with the back seat panel 20 to allow for expansion of the map pocket due to placement within the map pocket 80 of additional material. Optionally the membrane 82 may be fabricated from a material with an elastic insert to allow it to compliantly expand.

Figure 5:
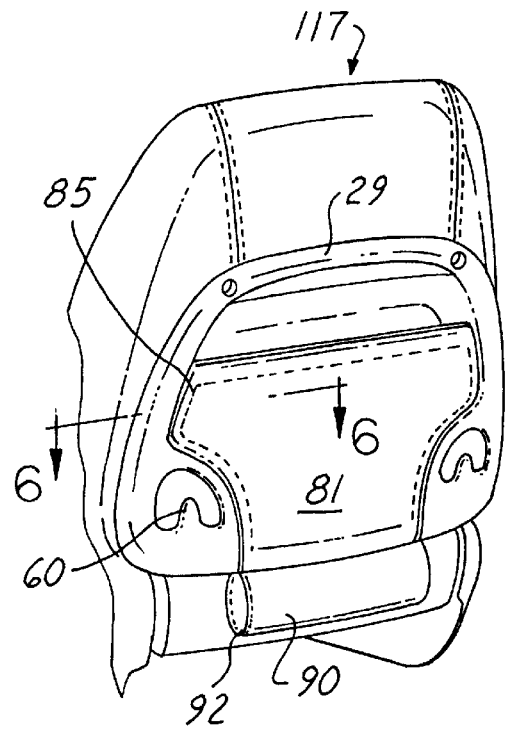
FIG. 5 is a view similar to that of FIG. 2 of still another alternate preferred embodiment of the present invention having the integrated hand grip assist handle, grocery bag holder and map pocket with an addition of a looped umbrella pocket at its lower end.
Figure 6:
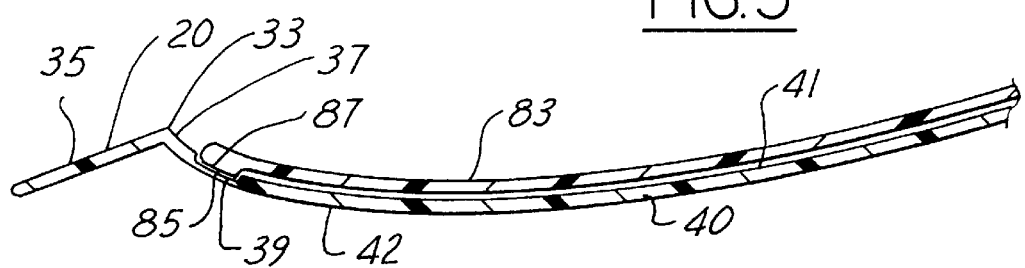
FIG. 6 is a partially enlarged sectional view taken along line 6—6 of FIG. 5 showing the connection of the map pocket membrane to the seat back panel.

Referring to FIGS. 5, 6 and 7 still another alternative embodiment of the present invention is provided by vehicle seat 117. Like items in vehicle seat 117 are given reference numerals as previously described for seats 7 and 17. The map pocket 81 and membrane 83 has lateral side edges 85. The side edge 85 is bent over to form a bead 87. The bead 87 is typically heat staked by the application of thermal heat or by sonic welding to the back seat panel 20. The bead 87 is fitted within a longitudinal groove 39 on the inboard side 37 of the back seat panel perimeter wall ridge. A plastic strip (not shown) is placed between the two layers of material of the bead 87. Another plastic strip (not shown) is placed on the forward side of the back seat panel 20 opposite the bead 87. A stake of polymeric material extends through the bead 87 and back seat panel 20. The staked plastic is allowed to flow to form a connection between the plastic strips to join the membrane 83 to the back seat panel 20. The placing of the bead 87 within the groove 39 allows the outer surface of the membrane 83 to be generally flush with the inboard portion 37 of the outer perimeter wall ridge and provides a particularly pleasing aesthetic appearance.

Figure 6A:
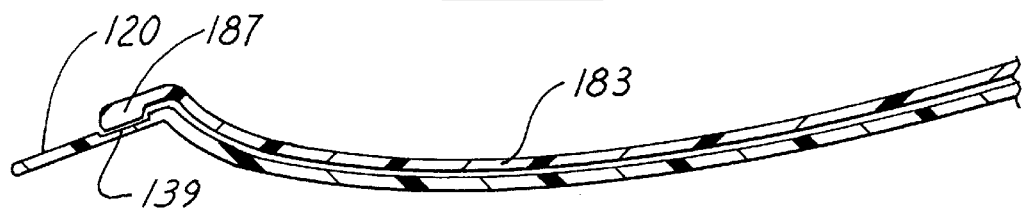
FIGS. 6A and 6B illustrate alternative methods of connecting the map pocket membrane to the seat back panel than that shown in FIG. 6.
Figure 6B:
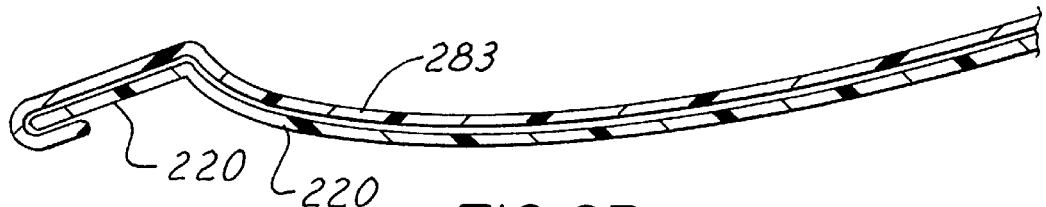

In the embodiment of the present invention shown in FIG. 6A, a back seat panel 120 has a groove 139 on its outboard surface in which the bead 187 of the map pocket membrane 183 is heat staked into in a manner as previously described in reference to FIG. 6. In FIG. 6B, the map pocket membrane 283 is wrapped around the lateral edge of the back seat panel to 220 and is connected thereto on a side of the back seat panel 220 adjacent to the seat back.

Seat 117 additionally provides a tubular umbrella pocket 90. The umbrella pocket 90 is suspended from the bottom of the back seat panel 20. The umbrella pocket 90 can be made from an extension of membrane 83 which is encircled into a horizontal loop. The umbrella pocket 90 can also be presown to the map pocket membrane 83. Stiffeners may be sewn into a hem 92 to retain the umbrella pocket in a generally open position for acceptance of an umbrella 102. FIGS. 4 and 5 demonstrate the utilization of vehicle seat 117. An umbrella 102 is held by the umbrella pocket 90. A map 104 is placed within the map pocket 81. A plastic grocery bag 106 has its handles 108 retained by the hook 60.

While the present invention was illustrated and described with respect to various preferred embodiments, such descriptions are exemplary only and not limiting in nature. It is well understood by those skilled in the art that various changes and modifications can be made in the invention without departing from the spirit and scope thereof, which is limited only by the appended claims.

What is claimed is:

1. A one piece seat back panel comprising:
    a perimeter wall having an upper wall portion, a lower wall portion and opposed first and second side wall portions interconnecting said upper and lower wall portions;
    a central panel portion recessed from said perimeter wall and connected to said first and second side wall portions and to said lower wall portion, said central panel portion having an upper edge portion spaced apart from said upper wall portion and defining an aperture therebetween such that said upper wall portion forms a hand grip; and
    a high strength premold insert in said perimeter upper wall portion.

2. A seat back panel as described in claim 1, wherein said seat back panel is made from a molded plastic.

3. A seat back panel as described in claim 1, wherein said perimeter wall upper wall portion is located above said upper edge portion of said central panel.

4. A seat back panel as described in claim 1, further comprising a plurality of bag hangers formed adjacent said perimeter wall lower wall portion.

5. A seat back panel as described in claim 4, wherein said bag hangers are hooks.

6. A seat back panel as described in claim 5, wherein said hooks are defined by crescent shaped apertures in said panel.

7. A seat back panel as described in claim 6, wherein said crescent shaped apertures in said panel are formed by a depression in said panel.

8. A seat back panel as described in claim 1, wherein said perimeter wall is a ridge.

9. A vehicle seat comprising:

a bun portion providing a seating platform for a vehicle occupant;

a seat back connected with said seat bun portion for providing a seat back to support a vehicle seat occupant; said seat back having a front surface for contact with a vehicle seat occupant and a rear surface; and a molded plastic seat back panel connected with said rear surface of said seat back, including:

a perimeter wall having an upper wall portion, a lower wall portion and opposed first and second side wall portions interconnecting said upper and lower wall portions; and a central panel portion with lateral perimeter edges recessed from said perimeter wall and connected to said first and said second side wall portions said central panel portion lower edge being connected to said lower wall portion, said central panel portion having an upper edge spaced apart from said perimeter wall upper wall portion and defining an aperture therebetween such that said perimeter upper wall portion forms a hand grip located above said central panel upper edge portion.

10. A vehicle seat as defined in claim 9, wherein the seat back panel further includes a plurality of grocery bag hooks.

11. A vehicle seat as described in claim 10, wherein the seat back panel bag hooks are defined by crescent shaped apertures provided is said seat back panel.

12. A vehicle seat as defined in claim 9, wherein said perimeter wall side wall portions and lower wall portion are formed as a ridge.

13. A vehicle seat as described in claim 9, wherein a membrane spans between the first and second side wall portions to define a map pocket therebetween.

14. A vehicle seat as described in claim 13, wherein said membrane is heat staked to said back seat panel.

15. A vehicle seat as described in claim 13, wherein said perimeter wall forms a ridge, said ridge having outboard, and inboard portions, and wherein said membrane has lateral edges joined to said ridge inboard portion.

16. A vehicle seat as described in claim 13, wherein said perimeter wall forms a ridge, said ridge having outboard and inboard portions, and wherein said membrane has lateral edges joined to said ridge outboard portion.

17. A vehicle seat as described in claim 13, wherein said membrane has lateral edges which further extend over said perimeter side wall portions and are connected with perimeter said side wall portions on a side of said seat back panel adjacent said seat back.

18. A vehicle seat as described in claim 13, wherein said membrane forming said map pocket has an upper portion along its lateral sides wherein it is unconnected with the perimeter wall side portions.

19. A vehicle seat as described in claim 9, wherein said seat back panel has connected thereto a looped membrane providing an umbrella pocket.

20. A vehicle seat as described in claim 19, wherein said looped membrane forms a horizontal tube at the bottom of said panel for an umbrella.

21. A vehicle seat as described in claim 20, wherein said membrane forming said umbrella pocket also spans between the perimeter wall first and second side wall portions to define a map pocket therebetween.

22. A vehicle seat as described in claim 9, wherein said back seat panel is connected by a connection hook to said back seat along a lower end of said seat back panel.

* * * * *